United States Patent
Marchezi et al.

(10) Patent No.: US 11,200,466 B2
(45) Date of Patent: Dec. 14, 2021

(54) MACHINE LEARNING CLASSIFIERS

(71) Applicant: Hewlett-Packard Development Company, L.P., Fort Collins, CO (US)

(72) Inventors: Humberto Cardoso Marchezi, Porto Alegre (BR); Taciano Perez, Porto Alegre (BR); Carlos Haas, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 936 days.

(21) Appl. No.: 15/763,102

(22) PCT Filed: Oct. 28, 2015

(86) PCT No.: PCT/US2015/057903
§ 371 (c)(1),
(2) Date: Mar. 24, 2018

(87) PCT Pub. No.: WO2017/074368
PCT Pub. Date: May 4, 2017

(65) Prior Publication Data
US 2018/0276507 A1    Sep. 27, 2018

(51) Int. Cl.
*G06K 9/72*    (2006.01)
*G06N 20/00*    (2019.01)
*G06F 16/33*    (2019.01)
*G06K 9/62*    (2006.01)

(52) U.S. Cl.
CPC .......... *G06K 9/72* (2013.01); *G06F 16/3334* (2019.01); *G06F 16/3346* (2019.01); *G06K 9/6257* (2013.01); *G06K 9/6268* (2013.01); *G06N 20/00* (2019.01)

(58) Field of Classification Search
CPC ...... G06K 9/72; G06K 9/6257; G06K 9/6268; G06F 16/3334; G06F 16/3346; G06N 20/00
USPC .......................................................... 706/12
See application file for complete search history.

(56) References Cited

U.S. PATENT DOCUMENTS

| | | | |
|---|---|---|---|
| 5,555,317 A | 9/1996 | Anderson | |
| 6,094,653 A * | 7/2000 | Li | ............ G06F 16/353 |
| 7,089,226 B1 * | 8/2006 | Dumais | .............. G06F 16/35 |
| | | | 707/740 |
| 7,292,531 B1 | 11/2007 | Hill | |
| 7,711,662 B2 | 5/2010 | Buscema | |
| 8,626,682 B2 * | 1/2014 | Malik | .............. G06F 16/90 |
| | | | 706/12 |

(Continued)

OTHER PUBLICATIONS

Huang et al. ~ "Big Data Machine Learning and Graph Analytics: Current State and Future Challenges" ~ IEEE Conf on Big Data ~ 2014 ~ 2 pgs.

(Continued)

*Primary Examiner* — Kerri L McNally
(74) *Attorney, Agent, or Firm* — Dierker & Kavanaugh PC

(57) ABSTRACT

In an implementation, a non-transitory machine-readable storage medium stores instructions that when executed by a processor, cause the processor to allocate classifier data structures to persistent memory, read a number of categories from a set of training data, and populate the classifier data structures with training data including training-based, category and word probabilities calculated based on the training data.

14 Claims, 9 Drawing Sheets

(56) References Cited

U.S. PATENT DOCUMENTS

| | | | | |
|---|---|---|---|---|
| 2003/0046297 A1* | 3/2003 | Mason | ................ | G06K 9/6259 |
| 2007/0005340 A1* | 1/2007 | Goutte | ................ | G06F 40/284 |
| | | | | 704/9 |
| 2009/0094177 A1* | 4/2009 | Aoki | ..................... | G06F 16/35 |
| | | | | 706/20 |
| 2010/0191768 A1* | 7/2010 | Malpani | ............. | G06F 16/3338 |
| | | | | 707/771 |
| 2015/0106308 A1* | 4/2015 | Harrison | ............... | G06N 3/126 |
| | | | | 706/12 |
| 2015/0106931 A1* | 4/2015 | Mankin | ................ | G06F 21/562 |
| | | | | 726/23 |

OTHER PUBLICATIONS

Wei et al ~ "Exploring Opportunities for Non-volatile Memories in Big Data Applications"~ BPOE ~ Mar. 2014 ~ 6 pgs.

\* cited by examiner

MACHINE LEARNING CLASSIFIERS

BACKGROUND

Machine learning classifiers enable computers to perform tasks they are not explicitly programmed to perform. Text classifiers, for example, enable computers to categorize text data to help organize increasing amounts of online information. A supervised learning technique can be used to train classifiers on how to make accurate predictions based on prior observations. In supervised learning, a classifier is given training data (e.g., documents) in which examples of text have already been identified with a correct label and/or class. The labeled/classified examples of text data are used to train the classifier so that it can be used to label and classify similar text examples.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
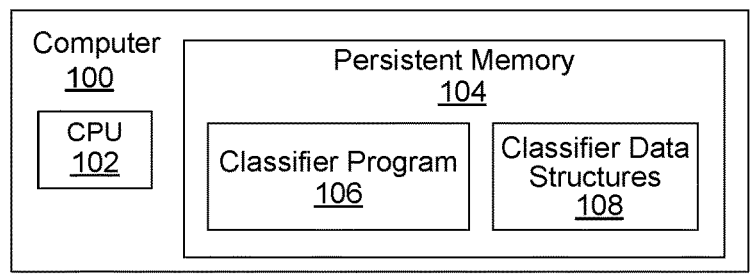
FIG. 1 shows a block diagram illustration of an example computer suitable for implementing examples of a machine learning classifier.

Machine learning classifiers can be trained to classify text content through a supervised learning technique that provides exposure to text examples that have already been correctly classified and labeled. Such classifiers can categorize text to help classify documents, search for information, and generally help to handle and organize an ever-increasing amount of online information. Examples of such classifiers include the Naïve Bayes classifier, linear regression, polynomial regression, and neural networks. These types of classifiers can include different modes of operation such as a training mode and a classifying/querying mode. When operating in a training mode, a classifier reads text examples with categories from a set of training data that have already been correctly classified and labeled, and it saves the training results. When operating in a classifying/querying mode, a classifier receives a query (i.e., query text data input to be classified), and leverages the training results previously obtained to calculate a best-match category with which to match the query.

In order to quickly service query requests, the training data in most computer systems is read from non-volatile storage into memory during system initialization. The training data can then be accessed and worked on directly in memory during system execution. After the system is finished working with the data, it flushes the data out of memory and back into non-volatile storage. As the size and complexity of classification tasks grow, greater amounts of training data are used. Consequently, the amount of time used to initialize the computer system for classification tasks increases. In many instances, the training data can be larger than the memory capacity of a computer system, which can result in frequent storage accesses. Increased accesses to storage can adversely affect training and query response time.

Recent developments in memory technology are making computers with persistent memory feasible. Thus, computers can increasing employ non-volatile memory that is directly addressable by the processor at byte/word granularity. Examples of memory technologies that enable such persistent memory include PCRAM (phase change memory), STTRAM (spin-transfer torque magnetic random-access memory), and RRAM (resistive random-access memory) or Memristors. The use of persistent memory brings processing much closer to non-volatile memory and can provide significant improvements in latency over the use of non-volatile disk and flash storage.

Accordingly, examples described herein enable methods and computing systems that use persistent memory to implement supervised machine learning classifiers. The examples use persistent memory to increase the performance of supervised classifier systems such as the Naïve Bayes classifier by reducing system initialization time and decreasing response time when using large training data sets. The examples include definitions for various persistent memory data structures and methods of using such structures that improve the efficiency of classifiers when operating in both a training mode and a classifying/querying mode. The examples simplify the implementation of machine learning classifiers compared to previous approaches that use non-volatile storage, for example, by eliminating serialization-related steps.

In one example, a method of implementing a machine learning classifier includes allocating in persistent memory, a training structure comprising an array of categories, a category data structure for each category in the array, and a global data structure. The method includes reading the categories of the array from training data, and for each category, reading training statements from the training data, splitting each training statement into an array of words, incrementing a category word counter for each word, calculating a category statement probability and storing it in the category data structure, and calculating a category word probability for each word and storing it in the category data structure. A global word probability for each word is also calculated and stored in the global data structure.

In another example, a computer includes a processor and a persistent memory. The computer also includes a machine learning classifier program with instructions that are executable by the processor to define and access classifier data structures within the persistent memory.

In another example, a non-transitory machine-readable storage medium stores instructions that when executed by a processor, cause the processor to allocate classifier data structures to persistent memory, read a number of categories from a set of training data, and populate the classifier data structures with training data including training-based, category and word probabilities calculated based on the training data.

FIG. 1 shows a basic block diagram illustration of an example computer 100 suitable for implementing examples of a machine learning classifier. Computer 100 can be implemented, for example, as a desktop or laptop PC, a notebook, a workstation, a server, and so on. For the sake of simplifying this description, various components that might be included with computer 100 are not shown. Such components can include, for example, an internal bus and various input/output (I/O) devices, such as a keyboard, a mouse, a display monitor, a key pad and/or a touch-sensitive display, a speaker, a microphone, a camera, and so on.

As shown in FIG. 1, the computer 100 includes a processor or plurality of processors illustrated as CPU 102. The computer 100 also includes a memory illustrated as persistent memory 104. In different examples, persistent memory 104 can be implemented by various memory technologies including PCRAM, STTRAM, and RRAM or Memristors. Persistent memory 104 comprises a non-transitory, non-volatile memory that is machine-readable (e.g., computer/processor-readable) and accessible by a processor 102 at a byte and/or word level. Thus, persistent memory 104 is accessed directly using CPU load and store operations. Persistent memory 104 can provide for the storage of machine-readable coded program instructions, data structures, program instruction modules, applications, and other data for the computer 100. In the FIG. 1 example, persistent memory 104 stores a machine learning classifier program 106 and classifier data structures 108. The machine learning classifier program 106, also referred to herein as classifier program 106, comprises program instructions executable by processor 102 to implement an example of a machine learning classifier using classifier data structures 108, as discussed in greater detail herein below. While there is no volatile RAM shown in the FIG. 1 example, computer 100 may or may not have volatile CPU caches.

Figure 2:
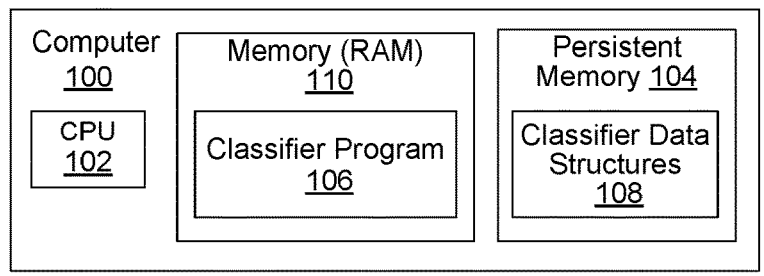
FIG. 2 shows a block diagram illustration of an alternate example of a computer in which a machine learning classifier program is stored in RAM instead of a persistent memory.

FIG. 2 shows a basic block diagram illustration of an alternate example of a computer 100 in which the machine learning classifier program 106 is stored in a memory (RAM) 110 instead of a persistent memory 104. In this example, therefore, the classifier program 106 can be flushed from RAM 110 during system execution and power cycling of the computer 100, while in the example of FIG. 1, the classifier program 106 along with the classifier data structures 108 remain in persistent memory 104.

Figure 3:
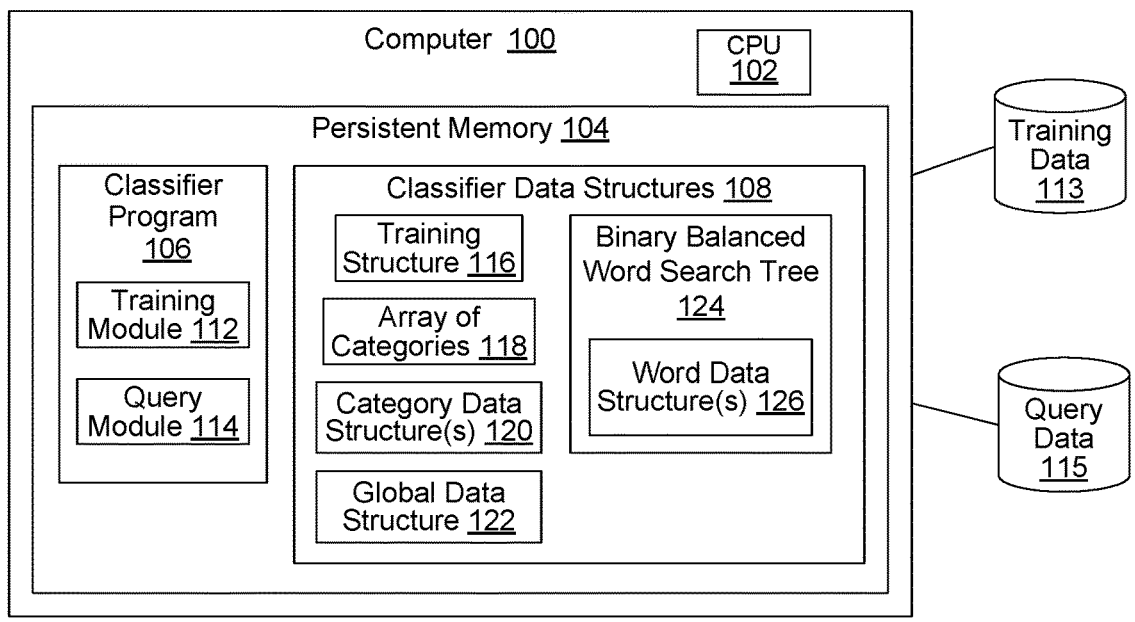
FIG. 3 shows a block diagram illustration of the example computer of FIG. 1 with additional details about a machine learning classifier program and a classifier data structure.

FIG. 3 shows a block diagram illustration of the example computer 100 of FIG. 1 with additional details about the machine learning classifier program 106 and classifier data structures 108. The machine learning classifier program 106 includes a training module 112 and query module 114. Instructions in modules 112 and 114 are executable by a processor 102 to perform different modes of operation of a machine learning classifier. For example, instructions from training module 112 can perform a training mode with respect to a set of training data 113, and instructions from query module 114 can perform a classifying/querying mode with respect to query data 115, as discussed in more detail herein below. As shown in FIG. 3, the classifier data structures 108 include a training structure 116, an array of categories 118, category data structures 120, a global data structure 122, and a binary balanced word search tree 124 that comprises word data structures 126.

Figure 4:
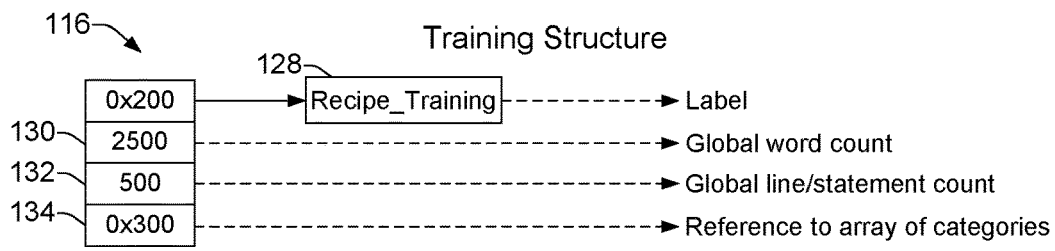
FIG. 4 shows a block diagram representation of an example of a training structure.

FIG. 4 shows a block diagram representation of an example of a training structure 116. The training structure 116 is an initial training structure that is allocated in persistent memory 104 the first time training data for a training topic is read. An example training structure 116 includes a label 128, a global word count 130, a global line/statement count 132, and a pointer reference 134 to the array of categories 118. The label 128 provides a descriptive indication of the topic for the training. As an example, the training topic shown for the training structure 116 is "Recipe_Training." The global word count 130 represents the number of words read from a set of training data 113, while the global line/statement count 132 represents the number of text statements read from the training data 113. The pointer reference 134 is a memory pointer that points to a location in persistent memory 104 where the array of categories 118 can be found.

Figure 5:
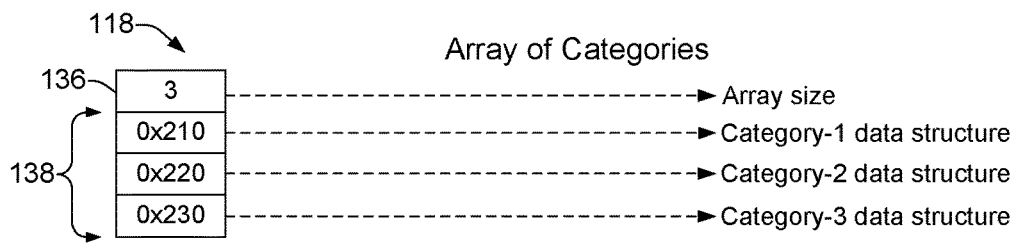
FIG. 5 shows a block diagram representation of an example of an array of categories.

FIG. 5 shows a block diagram representation of an example of an array of categories 118. The array of categories 118 is allocated in persistent memory 104 based on the number of categories read from training data 113. The categories can be represented as an array since the number of categories to be used is available in the beginning of the training process. An example array of categories 118 includes a size 136 to indicate the number of categories read from the training data 113, and pointer references 138 to point to locations in persistent memory 104 where category data structures 120 corresponding with each category can be found.

Figure 6:
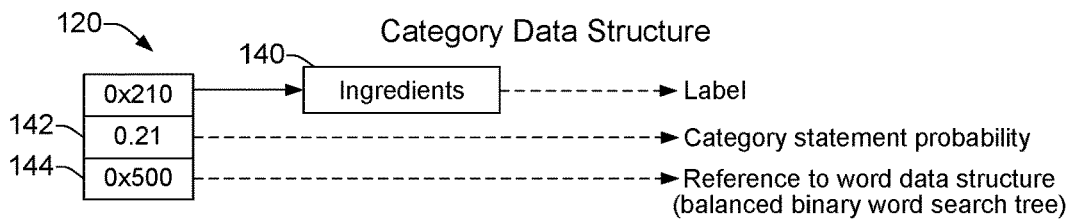
FIG. 6 shows a block diagram representation of an example of a category data structure.
Figure 9:
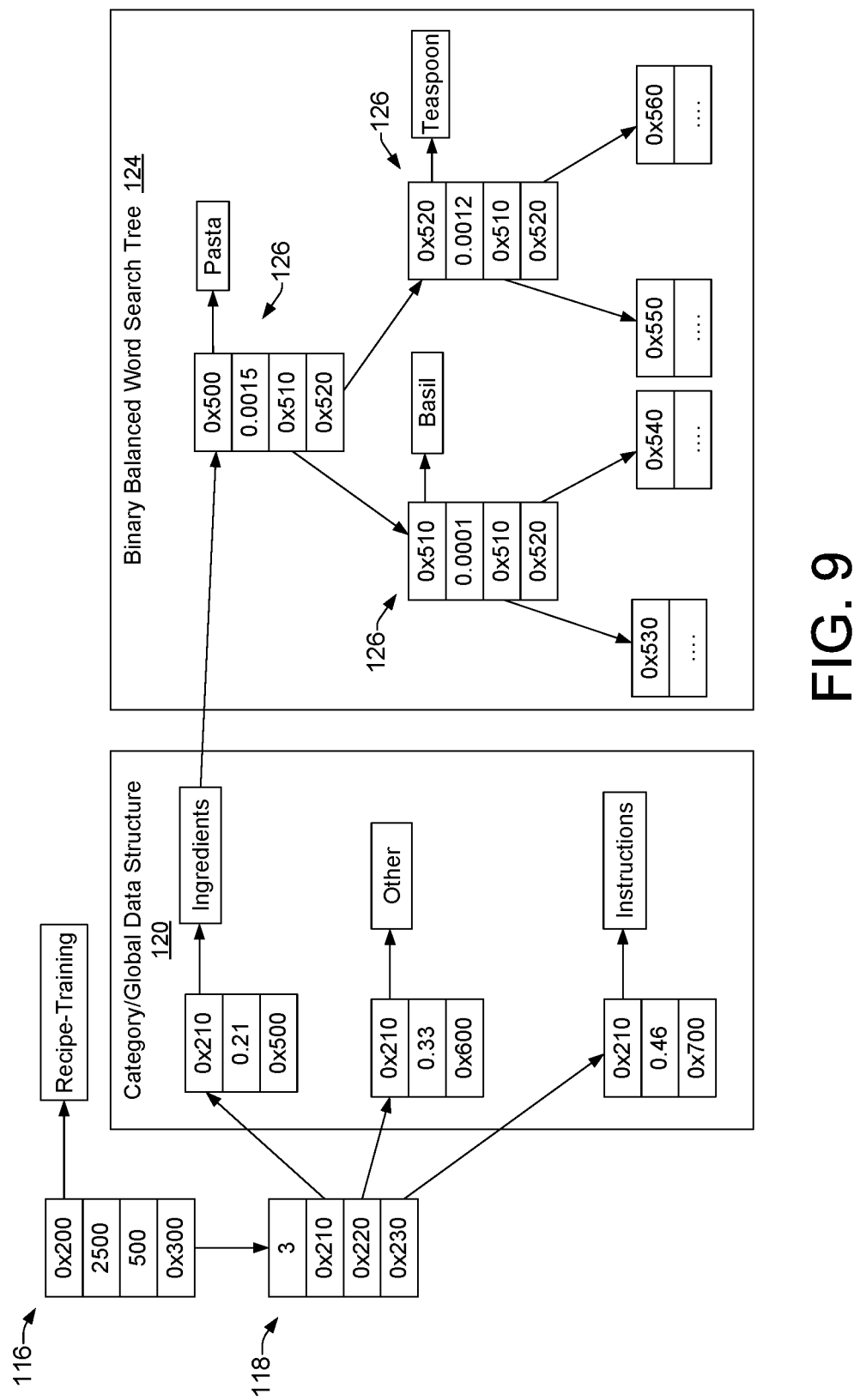
FIG. 9 shows a block diagram representation of an example classification including the interactions and connections between the various classifier data structures.

FIG. 6 shows a block diagram representation of an example of a category data structure 120. Category data structures 120 are allocated in persistent memory 104 based on the number of categories read from training data 113 and referenced from the array of categories 118. An example category data structure 120 includes a description 140 in a label field, a category statement probability 142, which is the probability of the category occurrence given a statement regardless of the words in the statement, and a pointer reference 144 to point to a location in persistent memory 104 where a word data structure 126 can be found within a binary balanced word search tree 124 (FIG. 9).

Figure 7:
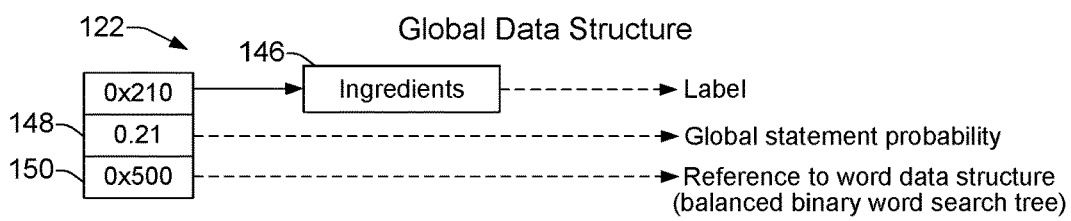
FIG. 7 shows a block diagram representation of an example of a global data structure.

FIG. 7 shows a block diagram representation of an example of a global data structure 122. A global data structure 122 is allocated in persistent memory 104 and is like a category data structure 120 for a global category to track global words and facilitate the calculation of probabilities of all words in all categories. Like the example category data structure 120, the example global data structure 122 includes a description 146 in a label field, a category statement probability 148, and a pointer reference 150 to point to a location in persistent memory 104 where a word data structure 126 can be found within a binary balanced word search tree 124 (FIG. 9).

Figure 8:
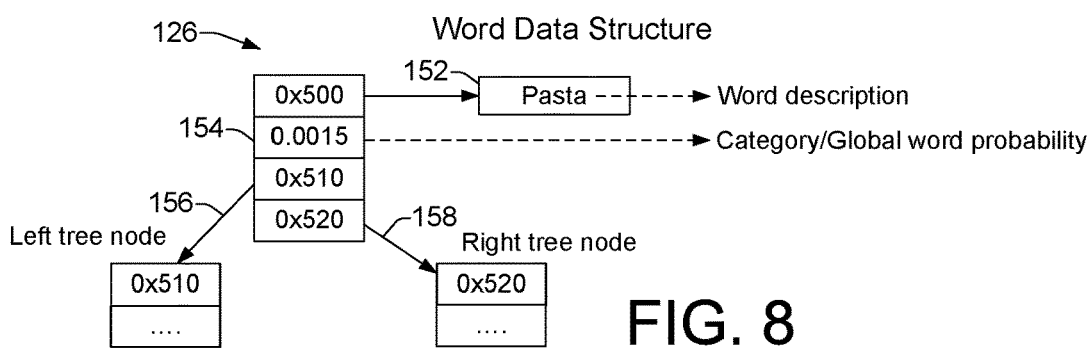
FIG. 8 shows a block diagram representation of an example of a word data structure.

FIG. 8 shows a block diagram representation of an example of a word data structure 126. The word data structure 126 represents a node in a binary balanced word search tree 124 (FIG. 9). FIG. 9 shows a block diagram representation of an example classification including the interactions and connections between the various classifier data structures 108 discussed above with reference to FIGS. 4-8. Thus, FIG. 9 illustrates an example of a binary balanced word search tree 124 comprising word data structures 126. As shown in FIGS. 8 and 9, a word data structure 126 includes a description 152 of the word itself as a label, its category probability 154 given the category it is associated with, or its global probability 154 in the case of the global data structure/category, a reference to the left node 156 in the binary tree 124 and another reference to the right node 158.

Figure 10:
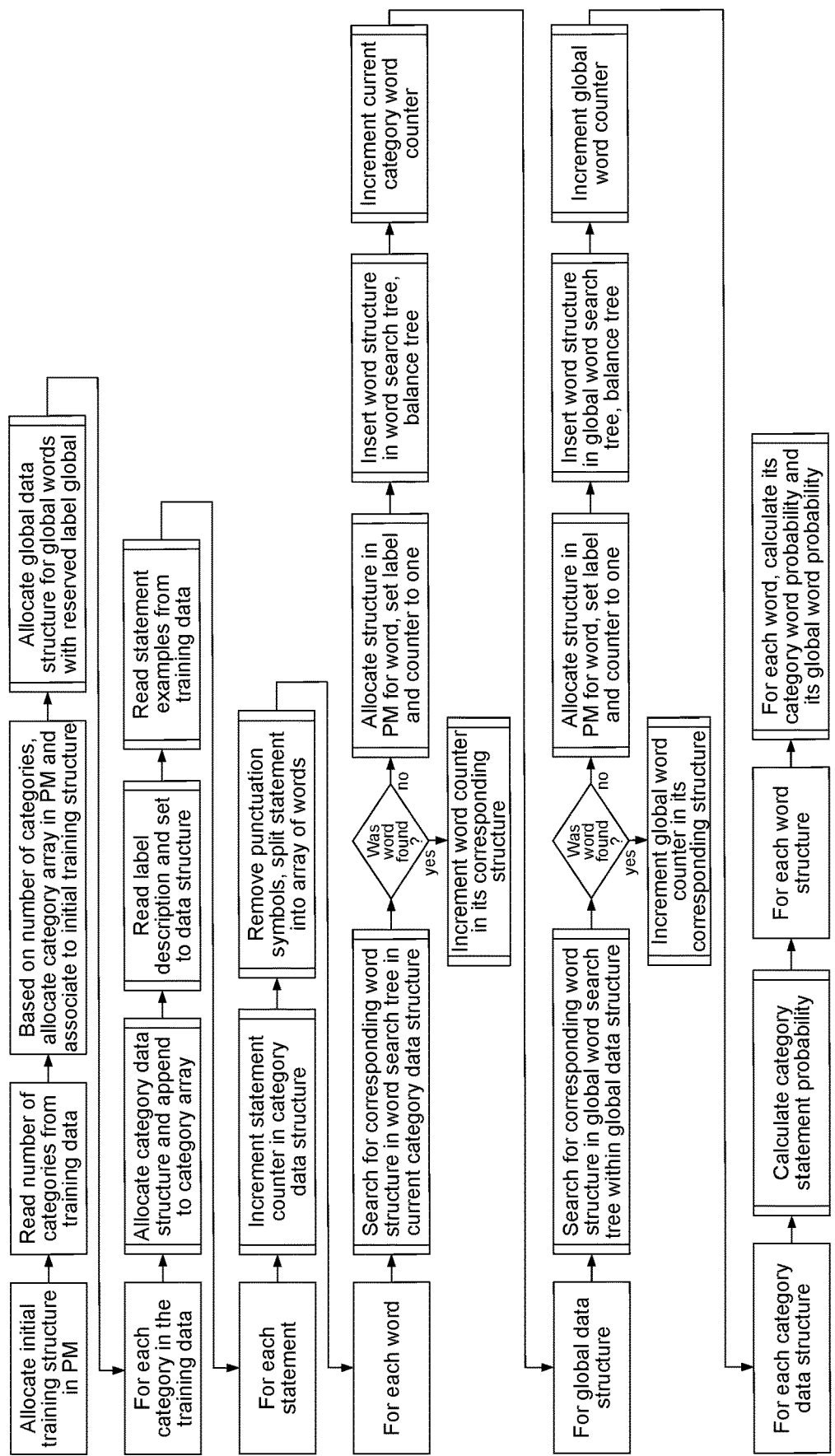
FIG. 10 shows a flow diagram illustrating example steps for using example classifier data structures in an example operational training mode of a machine learning classifier.

FIG. 10 shows a flow diagram illustrating steps for using classifier data structures 108 in an example operational training mode of a machine learning classifier. A training mode can begin with allocating an initial training structure 116 in a persistent memory 104. A number of categories can be read from a set of training data 113, and that number can be used to allocate a category array 118 in the persistent memory. The array is associated with the training structure using, for example, a pointer reference. In addition to a category array, a global data structure 122 is allocated for tracking global words.

For each category read from the training data 113, a category data structure 120 is allocated in persistent memory and appended to the category array 118 via a reference pointer, for example. The label description for each category is read from the training data and set to the category data structure 120. Statement examples are then read from the training data 113, and for each statement, a statement counter is incremented in the category data structure 120, punctuations are removed from the statement, and the statement is split into words.

For each word, a corresponding word structure 126 is searched for in a binary word search tree 124 within the current category data structure 120. If the word is found, a word counter is incremented in the corresponding word structure 126. If the word is not found, a new word structure is allocated in persistent memory and the word counter is set to one. The new word structure is inserted into the binary word search tree 124 and the current category word counter is incremented. For each word, this process is repeated for the global data structure 122. Thus, a corresponding word structure 126 is searched for in a binary word search tree 124 within the global data structure 122. If the word is found, a global word counter is incremented in the global word structure 126. If the word is not found, a new word structure is allocated in persistent memory and the word counter is set to one. The new word structure is inserted into the binary word search tree 124 and the global word counter is incremented.

For each category data structure 120, a category statement probability is calculated. For each word, a category word probability and a global word probability are calculate. These results are stored within the classifier data structures 108 as indicated above.

Figure 11:
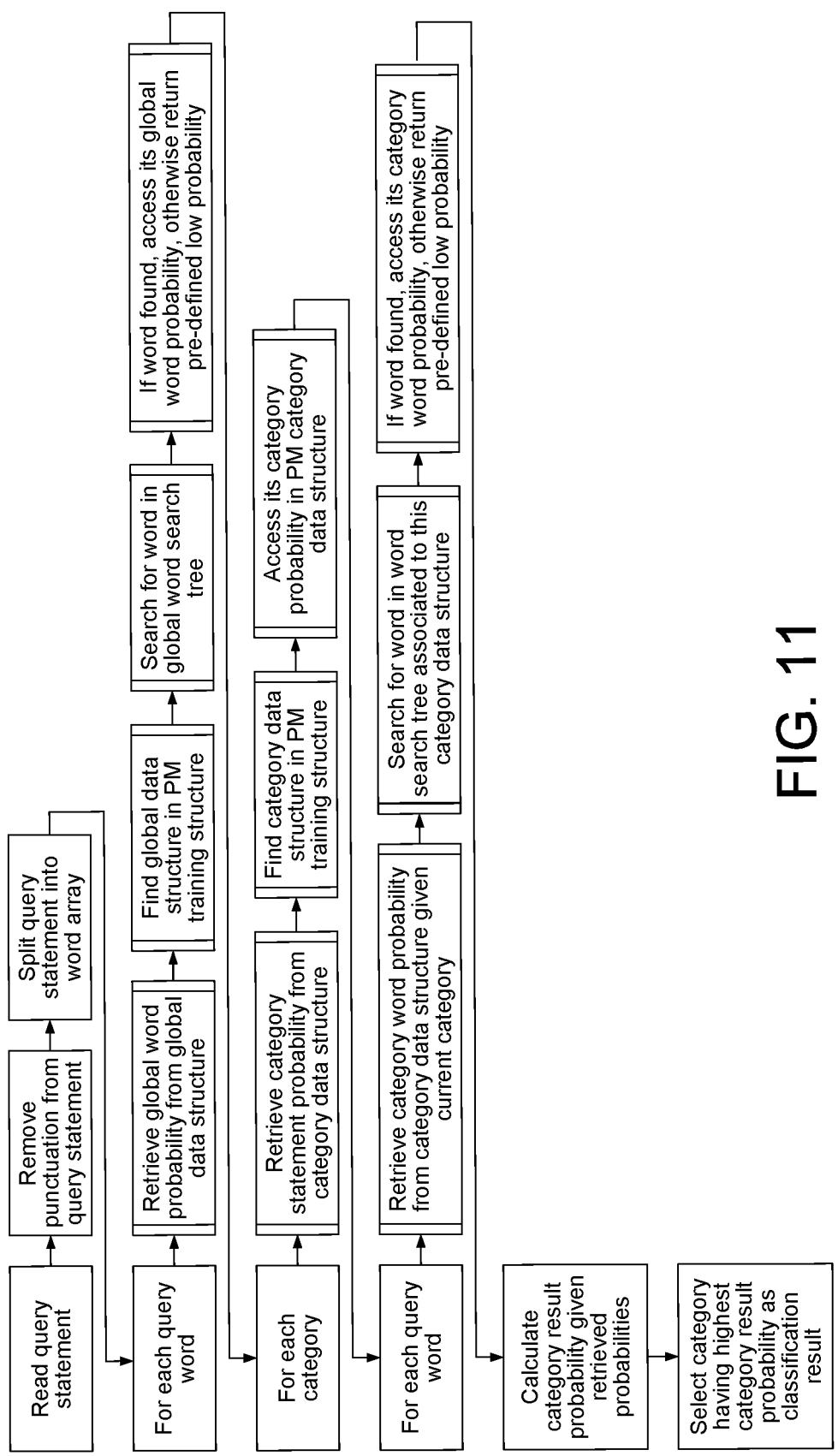
FIG. 11 shows a flow diagram illustrating example steps for using classifier data structures in an example operational classifying/querying mode of a machine learning classifier.

FIG. 11 shows a flow diagram illustrating steps for using classifier data structures 108 in an example operational classifying/querying mode of a machine learning classifier. A classifying mode can begin with reading a query data statement 115. Punctuation is then removed from the query statement and the statement is split into a word array. For each query word in the word array, a global word probability is retrieved from the global data structure 122. The global data structure can be found in the training structure in persistent memory. The word is then searched for in the global word search tree. If the word is found, its global word probability is accessed. If the word is not found, a pre-defined low probability is returned. A zero is not returned because this would drive product results to zero in subsequent calculations and result in improper classifications.

For each category, a category statement probability is retrieved from the corresponding category data structure, which is found in the training structure in persistent memory. The category statement probability is then accessed from the category data structure found in the persistent memory.

For each query word, the category word probability is retrieved from the current category data structure. The query word is searched for in the binary word search tree 124 associated to this current category data structure. If the word is found, its category word probability is accessed. Otherwise, a pre-defined low probability is returned. A zero is not returned, because the use of zero in subsequent calculations would drive the calculation products to zero and result in improper classifications.

A category result probability is calculated given the retrieved probabilities noted above, and the category having the highest category result probability is selected as the classification result for the query.

FIGS. 12, 13, 14, and 15, show flow diagrams that illustrate example methods 1200, 1300, and 1500, of implementing a machine learning classifier. The methods 1200, 1300, and 1500 are associated with examples discussed above with regard to FIGS. 1-11, and details of the operations shown in methods 1200, 1300, and 1500 can be found in the related discussion of such examples. Performing methods 1200, 1300, and 1500 may include operating on and/or accessing classifier data structures 108 within a non-transitory, machine-readable (e.g., computer/processor-readable) persistent memory medium, such as persistent memory 104 shown in FIGS. 1-3. Furthermore, the operations of methods 1200, 1300, and 1500 may be expressed and implemented as programming instructions stored on such a persistent memory 104. In some examples, implementing the operations of methods 1200, 1300, and 1500 can be achieved by a processor, such as processor 102 of FIGS. 1-3, by reading and executing the programming instructions stored in a memory 104. In some examples, implementing the operations of methods 1200, 1300, and 1500 can be achieved using an ASIC and/or other hardware components (not shown) alone or in combination with programming instructions executable by a processor 102.

The methods 1200, 1300, and 1500 may include more than one implementation, and different implementations of methods 1200, 1300, and 1500 may not employ every operation presented in the flow diagrams of FIGS. 12-15. Therefore, while the operations of methods 1200, 1300, and 1500 are presented in a particular order within the flow diagrams, the order of their presentation is not intended to be a limitation as to the order in which the operations may actually be implemented, or as to whether all of the operations may be implemented. For example, one implementation of method 1300 might be achieved through the performance of a number of initial operations, without performing some of the subsequent operations, while another implementation of method 1300 might be achieved through the performance of all of the operations.

Figure 12:
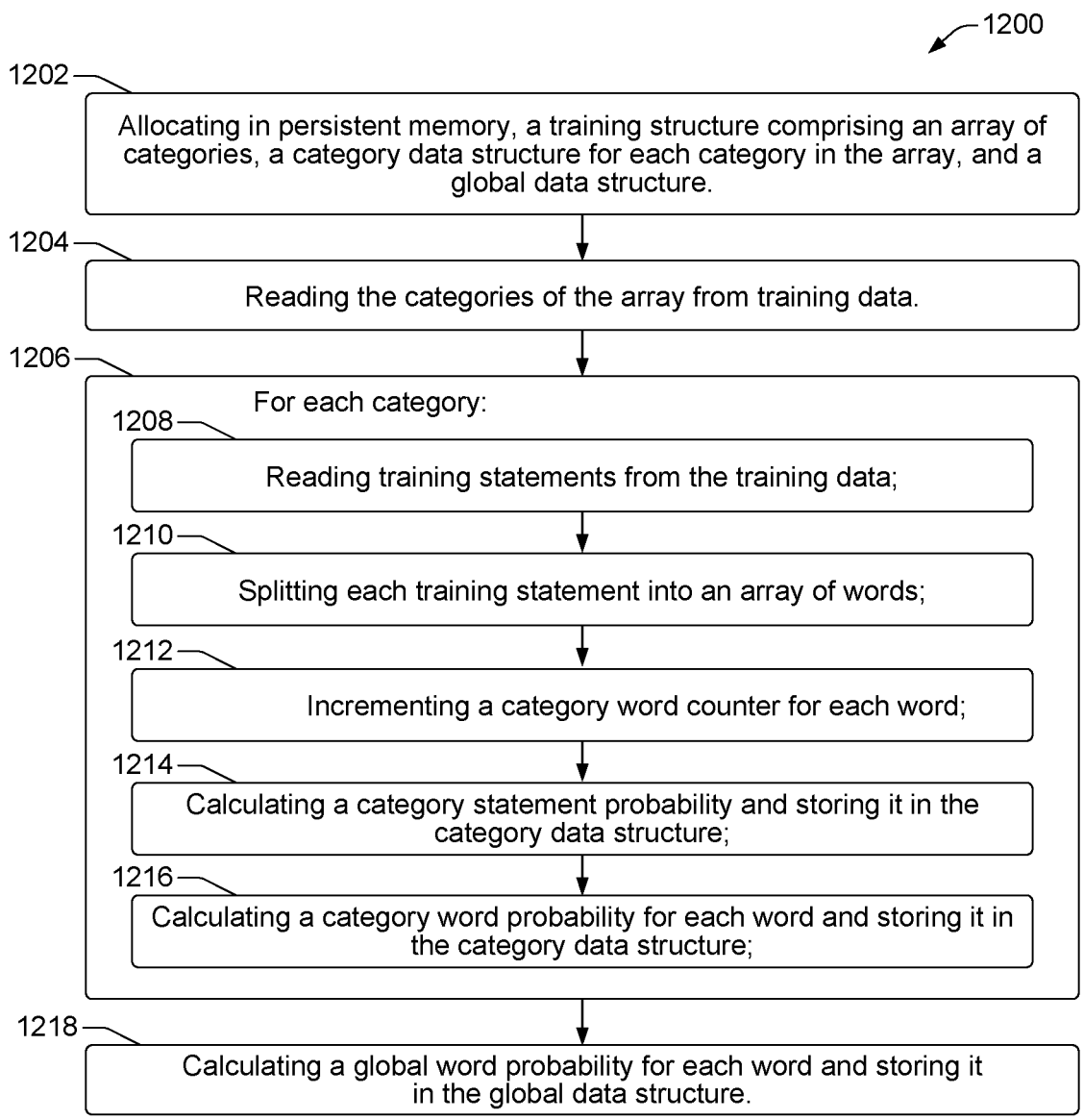
FIG. 12 shows a flow diagram that illustrates an example method of implementing a machine learning classifier.

Referring now to the flow diagram of FIG. 12, an example method 1200 of implementing a machine learning classifier begins at block 1202, with allocating in persistent memory, a training structure comprising an array of categories, a category data structure for each category in the array, and a global data structure. The method 1200 continues at block 1204 with reading the categories of the array from training data. At block 1206, for each category, the method includes reading training statements from the training data (block 1208), splitting each training statement into an array of words (block 1210), incrementing a category word counter for each word (block 1212), calculating a category statement probability and storing it in the category data structure (block 1214), and calculating a category word probability for each word and storing it in the category data structure (block 1216). Then at block 1218, the method includes calculating a global word probability for each word and storing it in the global data structure.

Figure 13:
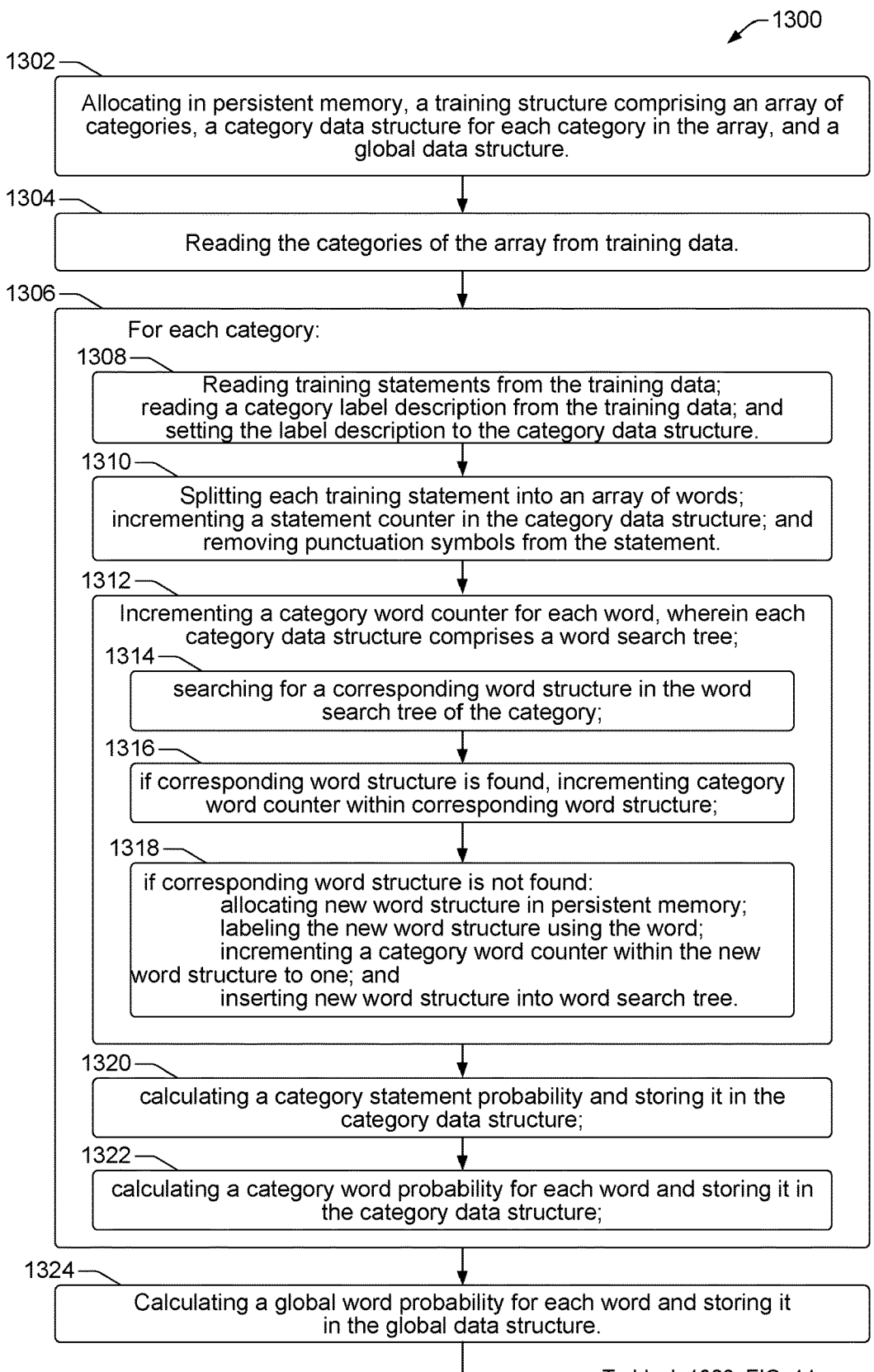
FIGS. 13 and 14, show flow diagrams that illustrate another example method of implementing a machine learning classifier.

Referring now to the flow diagram of FIG. 13, another example method 1300 of implementing a machine learning classifier is shown. Method 1300 includes the operations noted above in method 1200, but provides additional operations that further detail the method. Method 1300 begins at block 1302, with allocating in persistent memory, a training structure comprising an array of categories, a category data structure for each category in the array, and a global data structure. The method 1300 continues at block 1304 with reading the categories of the array from training data. At block 1306, for each category, the method includes reading training statements from the training data, reading a category label description from the training data, and setting the label description to the category data structure, as shown at block 1308.

As shown at block 1310, for each category, the method includes splitting each training statement into an array of words, incrementing a statement counter in the category data structure, and removing punctuation symbols from the statement. As shown at block 1312, for each category, the method includes incrementing a category word counter for each word, wherein each category data structure comprises a word search tree. Incrementing a category word counter can include searching for a corresponding word structure in the word search tree of the category (block 1314), and if a corresponding word structure is found, incrementing the category word counter within corresponding word structure, as shown at block 1316. However, as shown at block 1318, if a corresponding word structure is not found, incrementing the category word counter can include allocating a new word structure in persistent memory, labeling the new word structure using the word, incrementing a category word counter within the new word structure to one, and inserting new word structure into word search tree.

The method 1300 continues at blocks 1320 and 1322, for each category, with calculating a category statement probability and storing it in the category data structure, and calculating a category word probability for each word and storing it in the category data structure. As shown at block 1324, the method also includes calculating a global word probability for each word and storing it in the global data structure.

Figure 14:
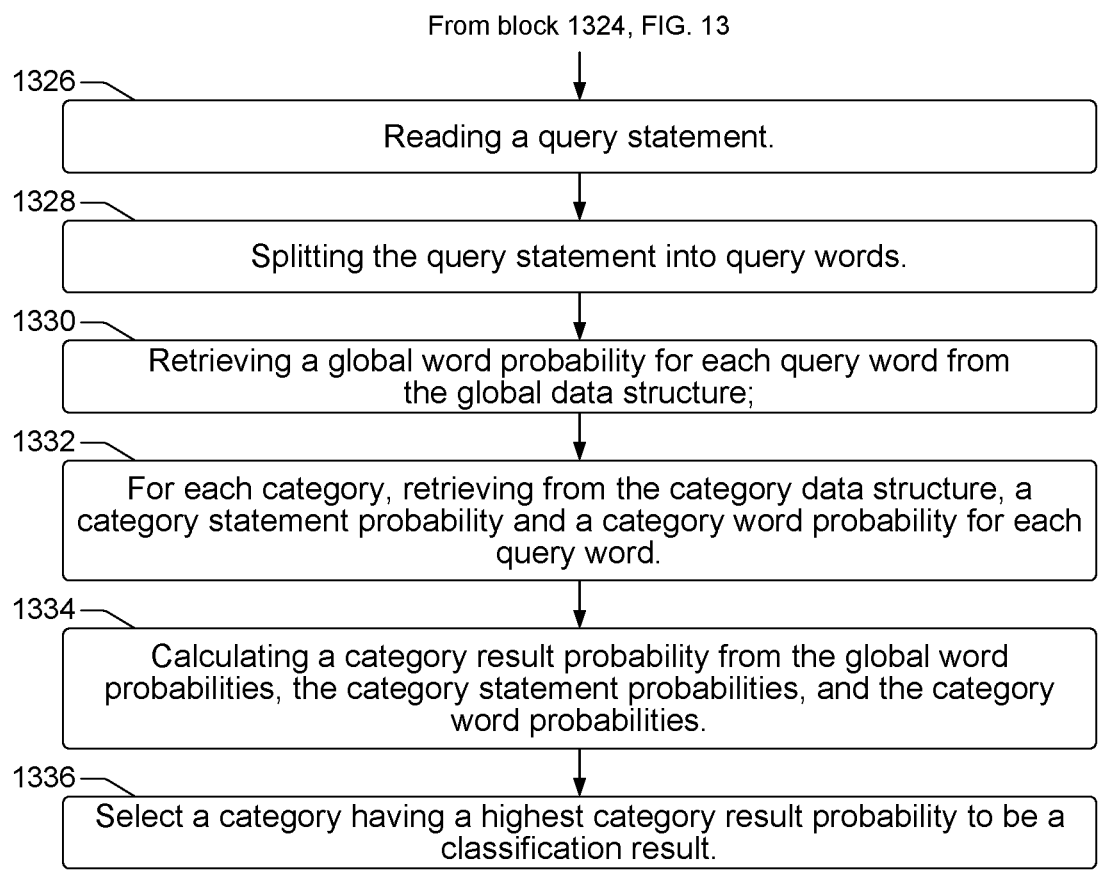

The method 1300 continues at FIG. 14, with a classifying/querying mode of operation in which the method includes reading a query statement (block 1326), splitting the query statement into query words (block 1328), retrieving a global word probability for each query word from the global data structure (block 1330), and for each category, retrieving from the category data structure, a category statement probability and a category word probability for each query word (block 1332). As shown at block 1334, the method can continue with calculating a category result probability from the global word probabilities, calculating the category statement probabilities, and calculating the category word probabilities. The category having a highest category result probability can then be selected to be a classification result, as shown at block 1336.

Figure 15:
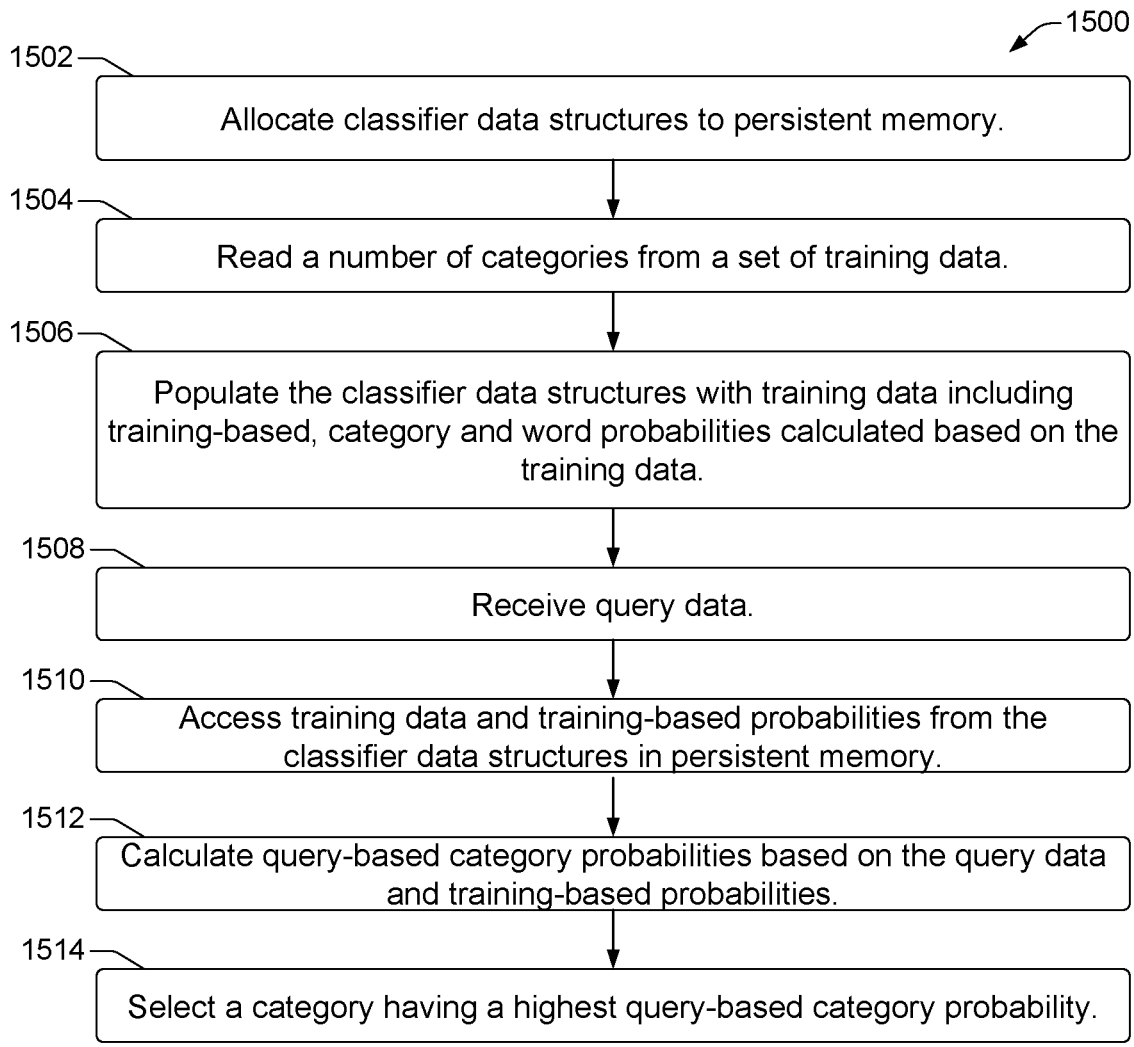
FIG. 15 shows a flow diagram that illustrates another example method of implementing a machine learning classifier.

Referring now to the flow diagram of FIG. 15, a another example method 1500 of implementing a machine learning classifier is shown. Method 1500 begins at block 1502, with allocating classifier data structures to persistent memory. A number of categories are read from a set of training data, as shown at block 1504. As shown at block 1506, the classifier data structures are populated with training data including training-based, category and word probabilities calculated based on the training data. The method can continue at block 1508 with receiving query data. As shown at blocks 1510 and 1512, the method includes accessing training data and training-based probabilities from the classifier data structures in persistent memory, and calculating query-based category probabilities based on the query data and training-based probabilities. A classification category can then be selected that has the highest query-based category probability, as shown at block 1514.

What is claimed is:

1. A method of implementing a machine learning classifier, the method comprising:
    allocating in persistent memory, a training structure comprising an array of categories, a category data structure for each category in the array, and a global data structure;
    reading the categories of the array from training data;
    for each category:
        reading training statements from the training data;
        splitting each training statement into an array of words;
        incrementing a category word counter for each word;
        calculating a category statement probability and storing it in the category data structure;
        calculating a category word probability for each word and storing it in the category data structure;
    calculating a global word probability for each word and storing it in the global data structure.

2. A method as in claim 1, further comprising:
    reading a query statement;
    splitting the query statement into query words;
    retrieving a global word probability for each query word from the global data structure;
    for each category, retrieving from the category data structure, a category statement probability and a category word probability for each query word;
    calculating a category result probability from the global word probabilities, the category statement probabilities, and the category word probabilities;
    select a category having a highest category result probability to be a classification result.

3. A method as in claim 1, wherein reading training statements from the training data for each category comprises:
    reading a category label description from the training data; and
    setting the label description to the category data structure.

4. A method as in claim 1, wherein splitting each training statement into an array of words for each category comprises:
    incrementing a statement counter in the category data structure; and
    removing punctuation symbols from the statement.

5. A method as in claim 1, wherein each category data structure comprises a word search tree, and wherein incrementing a category word counter for each word comprises, for each word:
    searching for a corresponding word structure in the word search tree of the category;

if a corresponding word structure is found, incrementing the category word counter within the corresponding word structure;
if a corresponding word structure is not found:
allocating a new word structure in persistent memory;
labeling the new word structure using the word;
incrementing a category word counter within the new word structure to one; and
inserting the new word structure into the word search tree.

6. A method as in claim 5, wherein the global data structure comprises a global word search tree, and wherein calculating a global word probability for each word comprises, for each word:
searching for a corresponding word structure in the global word search tree;
if a corresponding word structure is found, incrementing a global word counter within the corresponding word structure;
if a corresponding word structure is not found:
allocating a new word structure in persistent memory;
labeling the new word structure using the word;
incrementing a global word counter within the new word structure to one; and
inserting the new word structure into the global word search tree.

7. A computer comprising:
a processor;
a persistent memory; and
a machine learning classifier program with instructions executable by the processor to define and access classifier data structures within the persistent memory;
wherein the classifier data structures comprise a training structure comprising a descriptive training label, a global word count, a global line count, and a pointer reference to an array of categories.

8. A computer as in claim 7, wherein the classifier data structures comprise the array of categories, the array of categories comprising:
an array size to indicate a number of categories; and
a number of pointer references to category data structures wherein the number is equal to the array size.

9. A computer as in claim 8, wherein the classifier data structures comprise the category data structures, each category data structure comprising:
a descriptive category label;
a category probability; and
a pointer reference to a word data structure.

10. A computer as in claim 9, wherein the classifier data structures comprise the word data structure, the word data structure representing a node in a balanced binary word search tree and comprising:
a word description;
a category word probability;
a pointer reference to a left node; and
a pointer reference to a right node.

11. A computer as in claim 10, wherein the left and right nodes comprise additional word data structures in the balanced binary word search tree.

12. A computer as in claim 7, wherein the machine learning classifier program comprises instructions executable by the processor to access training data from the classifier data structures in the persistent memory, receive query data, and use the training data and query data to calculate a highest probable category for the query data.

13. A non-transitory machine-readable storage medium storing instructions that when executed by a processor, cause the processor to:
allocate, define, and access classifier data structures within persistent memory;
read a number of categories from a set of training data; and
populate the classifier data structures with training data including training-based, category and word probabilities calculated based on the training data;
wherein the classifier data structures comprise a training structure comprising a descriptive training label, a global word count, a global line count, and a pointer reference to an array of categories.

14. The non-transitory machine-readable storage medium as in claim 13, the instructions further causing the processor to:
receive query data;
access training data and training-based probabilities from the classifier data structures in persistent memory;
calculate query-based category probabilities based on the query data and training-based probabilities; and
select a category having a highest query-based category probability.

* * * * *